(12) United States Patent
Koike

(10) Patent No.: US 12,090,792 B2
(45) Date of Patent: Sep. 17, 2024

(54) TIRE AND TIRE-VEHICLE COMBINATION

(71) Applicant: SUMITOMO RUBBER INDUSTRIES, LTD., Kobe (JP)

(72) Inventor: Hiroki Koike, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/830,141

(22) Filed: Jun. 1, 2022

(65) Prior Publication Data

US 2022/0402308 A1    Dec. 22, 2022

(30) Foreign Application Priority Data

Jun. 15, 2021   (JP) .................................. 2021-099406

(51) Int. Cl.
  *B60C 11/01*   (2006.01)
  *B60C 11/03*   (2006.01)
  *B60C 11/12*   (2006.01)

(52) U.S. Cl.
  CPC ...... *B60C 11/0302* (2013.01); *B60C 11/0304* (2013.01); *B60C 11/0306* (2013.01); *B60C 11/1204* (2013.01); *B60C 2011/0355* (2013.01); *B60C 2011/1213* (2013.01)

(58) Field of Classification Search
  CPC ............. B60C 11/0083; B60C 11/0306; B60C 11/0304; B60C 11/0302; B60C 11/01
  See application file for complete search history.

(56) References Cited

U.S. PATENT DOCUMENTS

| | | | | |
|---|---|---|---|---|
| 2001/0035244 | A1* | 11/2001 | Diensthuber | B60C 11/11 152/209.16 |
| 2008/0257466 | A1* | 10/2008 | Fujita | B60C 11/0306 152/209.8 |
| 2010/0130951 | A1* | 5/2010 | Pierson | A61K 9/0036 106/243 |
| 2014/0166169 | A1* | 6/2014 | Tanaka | B60C 11/0304 152/209.15 |
| 2014/0371372 | A1* | 12/2014 | Hirayama | C08K 3/36 524/493 |
| 2018/0147894 | A1 | 5/2018 | Haseda | |
| 2018/0162176 | A1 | 6/2018 | Haseda | |
| 2019/0329596 | A1* | 10/2019 | Hiraishi | B60C 11/03 |

FOREIGN PATENT DOCUMENTS

| | | |
|---|---|---|
| EP | 3 711 978 A1 | 9/2020 |
| JP | S57147901 A * | 9/1982 |
| JP | 3-7604 A | 1/1991 |

(Continued)

*Primary Examiner* — Cedrick S Williams
(74) *Attorney, Agent, or Firm* — Birch, Stewart, Kolasch & Birch, LLP

(57) ABSTRACT

An outer surface TS of a tire 2 includes a tread surface T and a pair of side surfaces S. A plurality of arcs representing a contour of the tread surface T include a pair of crown arcs. A ratio of a radius CR1 of a first crown arc to a radius CR2 of a second crown arc is not less than 1.10 and not greater than 1.70. A total groove volume of a first circumferential groove 48 located in a zone from an equator to a first tread reference end TE1 is larger than a total groove volume of a second circumferential groove 50 located in a zone from the equator to a second tread reference end TE2.

18 Claims, 3 Drawing Sheets

(56) References Cited

FOREIGN PATENT DOCUMENTS

| | | | |
|---|---|---|---|
| JP | 9-136512 | A | 5/1997 |
| JP | 2001-158208 | A | 6/2001 |
| JP | 2004-210240 | A | 7/2004 |
| JP | 2009083524 | A * | 4/2009 |
| JP | 2012-162135 | A | 8/2012 |
| JP | 2015-145141 | A | 8/2015 |
| JP | 2017-222190 | A | 12/2017 |
| JP | 2018-83560 | A | 5/2018 |
| JP | 2018-95093 | A | 6/2018 |
| JP | 2020-152136 | A | 9/2020 |

* cited by examiner

TIRE AND TIRE-VEHICLE COMBINATION

TECHNICAL FIELD

The present invention relates to tires and tire-vehicle combinations. This application claims priority on Japanese Patent Application No. 2021-099406 filed on Jun. 15, 2021, the entire content of which is incorporated herein by reference.

BACKGROUND ART

When the tread pattern of a tire is formed as an asymmetric pattern, it is expected that steering stability and uneven wear resistance can be improved. In this case, in order to allow the asymmetric pattern to sufficiently exert its function, it has been considered to form the contour of a tread surface in a meridian cross-section, asymmetrically rather than symmetrically with respect to the equator plane (for example, PATENT LITERATURE 1 below).

CITATION LIST

Patent Literature

PATENT LITERATURE 1: Japanese Laid-Open Patent Publication No. 2004-210240

SUMMARY OF THE INVENTION

Technical Problem

When a tire is mounted to a high-output vehicle that is considered for running at a speed of 160 km/h or higher and that has a maximum output of 100 kW or higher, the camber angle of the tire is set to a negative camber angle, specifically, to an angle less than 0 degrees and greater than ~2 degrees. The tire to be mounted to the high-output vehicle is required to be able to exhibit good handling performance on a dry road surface and a wet road surface.

In the ground-contact surface of the tire mounted on the vehicle at a negative camber angle, the area of an inner portion with respect to the equator plane is larger, and the area of an outer portion with respect to the equator plane is smaller. When the vehicle corners at a high speed, the ground-contact pressure on the outer portion tends to locally increase. The local increase in ground-contact pressure causes a decrease in handling performance and uneven wear resistance. In order to suppress a local increase in ground-contact pressure, an increase in ground-contact area is required.

In order to improve handling performance on a wet road surface, it is necessary to ensure a groove volume. As described above, in the ground-contact surface of the tire mounted on the vehicle at a negative camber angle, the area of the outer portion with respect to the equator plane is smaller. If the groove area of the groove is increased in order to ensure a groove volume, the ground-contact area decreases, so that the ground-contact pressure is increased. If a large groove depth is adopted, it is possible to increase the groove volume while suppressing an increase in ground-contact pressure. In this case, it is necessary to consider the thickness of the tread.

The present invention has been made in view of such circumstances, and an object of the present invention is to provide a tire that can achieve improvement of handling performance on a dry road surface and a wet road surface without a decrease in uneven wear resistance.

Solution to Problem

A tire according to an aspect of the present invention is a tire including a tread having a plurality of circumferential grooves formed thereon so as to be aligned in an axial direction, wherein a width of the tread is represented as a distance in the axial direction from a first tread reference end to a second tread reference end, and the tire is mounted on a vehicle such that the first tread reference end is located on an outer side in a width direction of the vehicle. An outer surface of the tire includes a tread surface and a pair of side surfaces connected to ends of the tread surface. A contour of the tread surface is represented by a plurality of arcs aligned in the axial direction in a meridian cross-section of the tire in a state where the tire is fitted on a rim that is a normal rim, an internal pressure of the tire is adjusted to 230 kPa, and no load is applied to the tire. The plurality of arcs include a pair of crown arcs which each have a center on an equator plane of the tire and are tangent to each other at an equator of the tire. A ratio of a radius of the crown arc located on the first tread reference end side to a radius of the crown arc located on the second tread reference end side is not less than 1.10 and not greater than 1.70. Among the plurality of circumferential grooves, a circumferential groove located in a zone from the equator to the first tread reference end is a first circumferential groove, and a circumferential groove located in a zone from the equator to the second tread reference end is a second circumferential groove. A total groove volume of the first circumferential groove is larger than a total groove volume of the second circumferential groove.

Preferably, in the tire, a position, on the tread surface, at which a distance in the axial direction from the equator plane is 45% of a rim width of the rim is a drop reference position, and a distance in a radial direction from the equator to the drop reference position is a drop amount. A drop amount on the second tread reference end side is larger than a drop amount on the first tread reference end side, and a difference between the drop amount on the second tread reference end side and the drop amount on the first tread reference end side is not less than 1.0 mm and not greater than 6.0 mm.

Preferably, in the tire, the plurality of arcs include a pair of shoulder arcs which are each located on an outer side in the axial direction and connected to the side surface. A ratio of a radius of the shoulder arc located on the first tread reference end side to a radius of the shoulder arc located on the second tread reference end side is not less than 1.05 and not greater than 1.35.

Preferably, in the tire, a ratio of the total groove volume of the first circumferential groove to the total groove volume of the second circumferential groove is not less than 1.2 and not greater than 1.9.

Preferably, in the tire, the second circumferential groove is shallower than the first circumferential groove.

Preferably, in the tire, a distance from the equator to the second circumferential groove proximate to the equator is longer than a distance from the equator to the first circumferential groove proximate to the equator.

Preferably, in the tire, the second circumferential groove includes inner groove elements and outer groove elements located outward of the inner groove elements in the axial direction. The inner groove elements and the outer groove elements are alternately arranged in a circumferential direction.

Preferably, in the tire, an inclined groove is formed on the tread so as to be inclined relative to a circumferential direction. The inclined groove extends between the second circumferential groove and the first circumferential groove.

A tire-vehicle combination according to an aspect of the present invention includes the above-described tire and a vehicle. The tire is mounted on the vehicle at a camber angle greater than ~2 degrees and less than 0 degrees. The vehicle is a passenger car having a maximum output of 100 kW or higher.

Advantageous Effects of the Invention

According to the present invention, a tire that can achieve improvement of handling performance on a dry road surface and a wet road surface without a decrease in uneven wear resistance is obtained.

DETAILED DESCRIPTION

Figure 1:
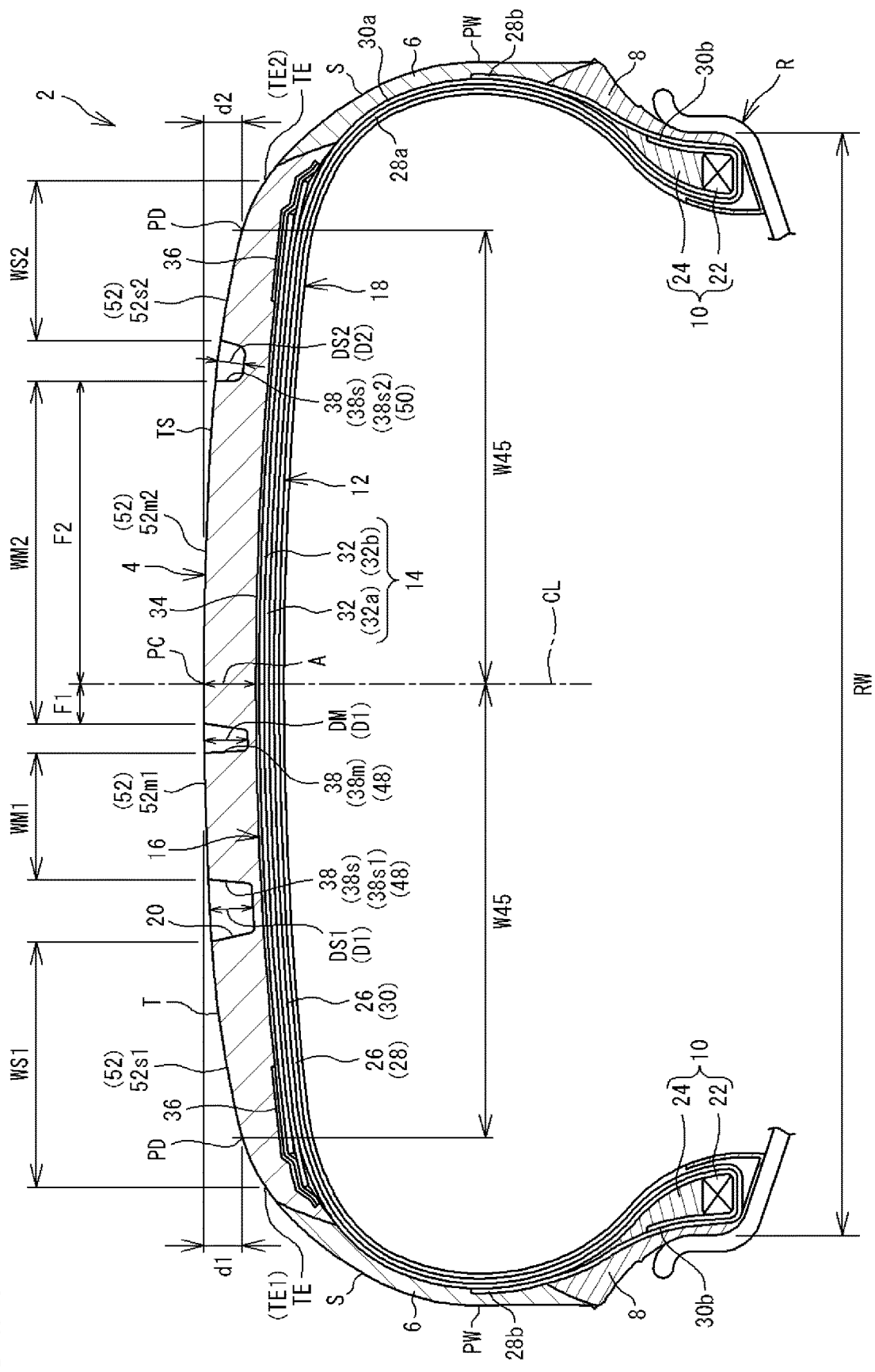
FIG. 1 is a cross-sectional view showing a part of a tire according to an embodiment of the present invention.

The following will describe in detail the present invention based on preferred embodiments with appropriate reference to the drawings.

In the present disclosure, a state where a tire is fitted on a normal rim, the internal pressure of the tire is adjusted to a normal internal pressure, and no load is applied to the tire is referred to as a normal state. A state where a tire is fitted on a normal rim, the internal pressure of the tire is adjusted to 230 kPa, and no load is applied to the tire is referred to as a standard state.

In the present disclosure, unless otherwise specified, the dimensions and angles of each component of the tire are measured in the standard state. The dimensions and angles of each component in a meridian cross-section of the tire, which cannot be measured in a state where the tire is fitted on the normal rim, are measured in a cross-section of the tire obtained by cutting the tire along a plane including a rotation axis, with the distance between right and left beads being made equal to the distance between the beads in the tire that is fitted on the normal rim.

The normal rim means a rim specified in a standard on which the tire is based. The "standard rim" in the JATMA standard, the "Design Rim" in the TRA standard, and the "Measuring Rim" in the ETRTO standard are normal rims.

The normal internal pressure means an internal pressure specified in the standard on which the tire is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures.

A normal load means a load specified in the standard on which the tire is based. The "maximum load capacity" in the JATMA standard, the "maximum value" recited in the "TIRE LOAD LIMITS AT VARIOUS COLD INFLATION PRESSURES" in the TRA standard, and the "LOAD CAPACITY" in the ETRTO standard are normal loads.

In the present disclosure, an angle of a groove with respect to the circumferential direction or the axial direction (that is, an inclination angle of the groove) is represented as an angle of an edge of the groove with respect to the circumferential direction or the axial direction. When an inclination angle obtained on the basis of one edge of the groove is different from an inclination angle obtained on the basis of the other edge of the groove, the inclination angle of the groove is represented as the average of these inclination angles.

In the present disclosure, the groove width of a groove is represented as the length from one edge to the other edge of the groove, measured along a line orthogonal to a center line of the groove width. When the groove width changes in the longitudinal direction of the groove, the groove width is represented as the average of the maximum width and the minimum width of the groove.

In the present disclosure, a camber angle refers to an angle formed between a plane perpendicular to a road surface and the equator plane of a tire in a state where the tire is mounted on a vehicle. A state where a tire is mounted on a vehicle at a negative camber angle means a state where the upper side of the tire is located on the vehicle side with respect to the lower side of the tire when the tire is mounted on the vehicle.

In the present disclosure, a speed symbol refers to, for example, a symbol that is specified in the JATMA standard and that represents a maximum speed at which a tire can run in a state where the mass indicated by the load index of the tire is applied to the tire under a specified condition. A tire having a speed symbol of H or more means a tire having a speed symbol of H, V, W, or Y.

In the present disclosure, a load index (LI) refers to, for example, an index that is specified in the JATMA standard and that represents a maximum mass permitted to be applied to a tire under a specified condition, that is, a maximum load capacity, as an index number.

FIG. 1 shows a part of a tire 2 according to an embodiment of the present invention. The tire 2 is a tire for a passenger car. In FIG. 1, the tire 2 is fitted on a rim R. The rim R is a normal rim. The interior of the tire 2 is filled with air to adjust the internal pressure of the tire 2.

The tire 2 fitted on the rim R is also referred to as a tire-rim assembly. The tire-rim assembly includes the rim R and the tire 2 fitted on the rim R.

FIG. 1 shows a part of a cross-section (hereinafter, also referred to as a meridian cross-section) of the tire 2 taken along a plane including the rotation axis (not shown) of the tire 2. In FIG. 1, the right-left direction is the axial direction of the tire 2, and the up-down direction is the radial direction of the tire 2. The direction perpendicular to the surface of the drawing sheet of FIG. 1 is the circumferential direction of the tire 2. In FIG. 1, an alternate long and short dash line CL represents the equator plane of the tire 2.

In FIG. 1, a length indicated by reference sign RW is a rim width (see JATMA or the like). The rim width RW is the distance in the axial direction from one rim base line to another rim base line.

In FIG. 1, a position indicated by reference sign PW is an outer end in the axial direction of the tire 2. In the case where decorations such as patterns and letters are present on the outer surface of the tire 2, the outer end PW is specified on the basis of a virtual outer surface obtained on the assumption that the decorations are not present. The distance in the axial direction from one outer end PW to the other outer end PW is the maximum width of the tire 2, that is, the cross-sectional width (see JATMA or the like) of the tire 2.

Each outer end PW is a position (hereinafter, maximum width position) at which the tire 2 has the maximum width.

The tire 2 includes a tread 4, a pair of sidewalls 6, a pair of clinches 8, a pair of beads 10, a carcass 12, a belt 14, a band 16, and an inner liner 18.

The tread 4 comes into contact with a road surface at the outer surface thereof. Grooves 20 are formed on the tread 4. Accordingly, a tread pattern is formed.

The tread 4 includes a cap layer and a base layer which are not shown. The cap layer forms an outer surface of the tread 4. The cap layer is formed from a crosslinked rubber for which wear resistance and grip performance are taken into consideration. The base layer is located inward of the cap layer in the radial direction. The base layer is formed from a crosslinked rubber that has low heat generation properties.

In FIG. 1, a position indicated by reference sign PC corresponds to the equator of the tire 2. The equator PC is the point of intersection of the outer surface of the tread 4 and the equator plane CL. In the case where the groove 20 is present on the equator plane CL, the equator PC is specified on the basis of a virtual outer surface obtained on the assumption that the groove 20 is not provided.

Each sidewall 6 is connected to an end of the tread 4. The sidewall 6 is located inward of the tread 4 in the radial direction. The sidewall 6 extends from the end of the tread 4 toward the clinch 8 along the carcass 12. The sidewall 6 is formed from a crosslinked rubber for which cut resistance is taken into consideration.

Each clinch 8 is located inward of the sidewall 6 in the radial direction. The clinch 8 comes into contact with the rim R. The clinch 8 is formed from a crosslinked rubber for which wear resistance is taken into consideration.

Each bead 10 is located inward of the clinch 8 in the axial direction. The bead 10 is located inward of the sidewall 6 in the radial direction. The bead 10 includes a core 22 and an apex 24.

The core 22 includes a wire made of steel which is not shown. The apex 24 is located outward of the core 22 in the radial direction. The apex 24 is tapered outward. The apex 24 is formed from a crosslinked rubber that has high stiffness. In the radial direction, the outer end of the apex 24 is located inward of the maximum width position PW. The length of the apex 24 is set as appropriate in the range of 20 mm to 40 mm.

The carcass 12 is located inward of the tread 4, the pair of sidewalls 6, and the pair of clinches 8. The carcass 12 extends on and between one bead 10 and the other bead 10. The carcass 12 has a radial structure.

The carcass 12 includes at least one carcass ply 26. The carcass 12 of the tire 2 is composed of two carcass plies 26. On the radially inner side of the tread 4, the carcass ply 26 located on the inner side is a first carcass ply 28, and the carcass ply 26 located outward of the first carcass ply 28 is a second carcass ply 30.

The first carcass ply 28 includes a first ply body 28a which extends on and between one bead 10 and the other bead 10, and a pair of first turned-up portions 28b which are connected to the first ply body 28a and turned up around the respective beads 10 from the inner side toward the outer side in the axial direction. In the radial direction, an end of each first turned-up portion 28b is located outward of the maximum width position PW.

The second carcass ply 30 includes a second ply body 30a which extends on and between one bead 10 and the other bead 10, and a pair of second turned-up portions 30b which are connected to the second ply body 30a and turned up around the respective beads 10 from the inner side toward the outer side in the axial direction. In the radial direction, an end of each second turned-up portion 30b is located between the outer end of the apex 24 and the core 22.

Each carcass ply 26 includes a large number of carcass cords aligned with each other, which are not shown. Each carcass cord intersects the equator plane CL. The carcass cords are cords formed from an organic fiber. Examples of the organic fiber include nylon fibers, rayon fibers, polyester fibers, and aramid fibers.

The belt 14 is located inward of the tread 4 in the radial direction. The belt 14 is stacked on the carcass 12 from the outer side in the radial direction. In the tire 2, the width in the axial direction of the belt 14 is not less than 65% and not greater than 85% of the cross-sectional width.

The belt 14 includes at least two layers 32 stacked in the radial direction. The belt 14 of the tire 2 is composed of two layers 32 stacked in the radial direction. Of the two layers 32, the layer 32 located on the inner side is an inner layer 32a, and the layer 32 located on the outer side is an outer layer 32b. As shown in FIG. 1, the inner layer 32a is wider than the outer layer 32b. The length from the end of the outer layer 32b to the end of the inner layer 32a is not less than 3 mm and not greater than 10 mm.

Each of the inner layer 32a and the outer layer 32b includes a large number of belt cords aligned with each other, which are not shown. Each belt cord is inclined relative to the equator plane CL. The material of each belt cord is steel.

The band 16 is located between the tread 4 and the belt 14 in the radial direction. The band 16 is stacked on the belt 14 on the inner side of the tread 4. The band 16 covers the entirety of the belt 14. The band 16 is wider than the belt 14. The length from the end of the belt 14 to the end of the band 16 is not less than 3 mm and not greater than 7 mm.

The band 16 includes a helically wound band cord which is not shown. The band cord extends substantially in the circumferential direction. Specifically, an angle of the band cord with respect to the circumferential direction is not greater than 5°. The band 16 has a jointless structure. In the tire 2, a cord formed from an organic fiber is used as the band cord. Examples of the organic fiber include nylon fibers, rayon fibers, polyester fibers, and aramid fibers.

The band 16 of the tire 2 includes a full band 34 and a pair of edge bands 36. The full band 34 covers the entirety of the belt 14 on the outer side in the radial direction. The pair of edge bands 36 are disposed so as to be spaced apart from each other in the axial direction with the equator plane CL located therebetween. Each edge band 36 covers the end of the full band 34 on the outer side in the radial direction. The band 16 may be composed of the full band 34, or may be composed of the pair of edge bands 36.

The inner liner 18 is located inward of the carcass 12. The inner liner 18 forms an inner surface of the tire 2. The inner liner 18 is formed from a crosslinked rubber that has a low gas permeability coefficient. The inner liner 18 maintains the internal pressure of the tire 2.

Figure 2:
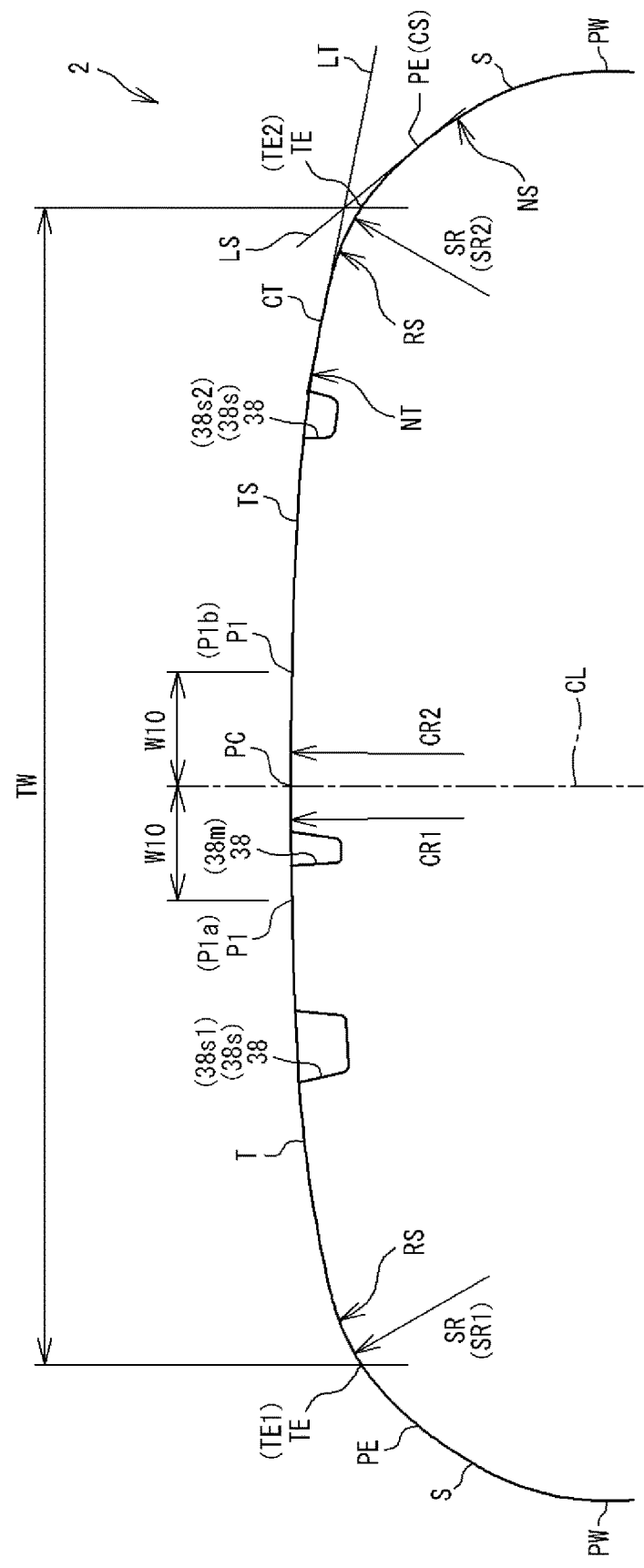
FIG. 2 is a cross-sectional view showing a part of the contour of the tire shown in FIG. 1.

FIG. 2 shows the contour of the tire 2 shown in FIG. 1. The contour of the tire 2 is obtained by measuring the outer surface shape of the tire 2 in the standard state, for example, by a displacement sensor. In FIG. 2, the right-left direction is the axial direction of the tire 2, and the up-down direction is the radial direction of the tire 2. The direction perpendicular to the surface of the drawing sheet of FIG. 2 is the circumferential direction of the tire 2.

FIG. 2 shows a contour of the outer surface (hereinafter, referred to as tire outer surface TS) of the tire 2 in the meridian cross-section of the tire 2 in the standard state. The contour of the tire outer surface TS is formed by connecting straight lines or arcs. The straight lines or the arcs representing the contour are also referred to as contour lines.

The tire outer surface TS includes a tread surface T and a pair of side surfaces S. In FIG. 2, a position indicated by reference sign PE corresponds to the boundary between the tread surface T and the side surface S. The tread surface T is tangent to each side surface S at the boundary PE. The boundary PE is an end of the tread surface T and is also the outer end of the side surface S.

The tread surface T forms an outer circumferential surface of the tire 2 that comes into contact with a road surface. In the present disclosure, the contour of the tread surface T is described as a contour of a virtual outer surface (also referred to as a virtual tread surface) obtained on the assumption that no groove is provided. The tread surface T includes the equator PC.

In the meridian cross-section, the contour of the tread surface T is represented by a plurality of arcs aligned in the axial direction. In the contour of the tread surface T, two adjacent arcs are tangent to each other. Between the equator PC and the end PE of the tread surface T, the radius of the arc located on the inner side in the axial direction is larger than the radius of the arc located on the outer side in the axial direction.

Among the plurality of arcs forming the contour of the tread surface T, the arc that is located on each outer side in the axial direction and connected to the side surface S is a shoulder arc. In the tire 2, the shoulder arc has the smallest radius among the plurality of arcs forming the contour of the tread surface T. In FIG. 2, an arrow indicated by reference sign SR indicates the radius of the shoulder arc.

In FIG. 2, a portion (hereinafter, also referred to as a curved line portion) represented by the shoulder arc is indicated by reference sign RS. In the meridian cross-section, the contour of the tire outer surface TS includes, in a portion at each end PE of the tread surface T, the curved line portion RS composed of the arc that has the smallest radius among the plurality of arcs included in the contour of the tread surface T and is connected to the side surface S.

Each side surface S is connected to the end PE of the tread surface T. The side surface S is located inward of the tread surface T in the radial direction. In the present disclosure, the contour of the side surface S is described as a contour of a virtual outer surface (also referred to as a virtual side surface) obtained on the assumption that decorations such as patterns and letters are not present. The side surface S includes the maximum width position PW.

Although not described in detail, in the meridian cross-section, the contour of the side surface S includes a straight contour line and an upper arc. The straight contour line is a straight line that is tangent to the curved line portion RS at the end PE of the tread surface T. The upper arc is an arc that is connected to the straight contour line and passes through the maximum width position PW. Although not shown, the upper arc has a center on a straight line that passes through the maximum width position PW and extends in the axial direction. In the tire 2, the upper arc and the curved line portion RS may be connected by an arc, not by a straight line. The upper arc and the curved line portion RS may be directly connected to each other.

In the contour of the tire outer surface TS, the above-described curved line portion RS is tangent to a contour line (hereinafter, referred to as inner adjacent contour line NT) adjacent to the curve line portion RS on the inner side in the axial direction, at a contact point CT. The curved line portion RS is tangent to a contour line (hereinafter, referred to as outer adjacent contour line NS) that is adjacent to the curve line portion RS on the outer side in the axial direction and forms a contour of the side surface S, at a contact point CS. The contour of the tire outer surface TS includes the inner adjacent contour line NT which is located axially inward of the curved line portion RS and is tangent to the curved line portion RS, and the outer adjacent contour line NS which is located axially outward of the curved line portion RS and is tangent to the curved line portion RS. In the tire 2, the contact point CS is the above-described boundary PE.

In FIG. 2, a solid line LT is a line tangent to the curved line portion RS at the contact point CT between the inner adjacent contour line NT and the curved line portion RS. A solid line LS is a line tangent to the curved line portion RS at the contact point CS between the outer adjacent contour line NS and the curved line portion RS. A position indicated by reference sign TE is the point of intersection of the tread surface T and a straight line that passes through the point of intersection of the tangent line LT and the tangent line LS and that extends in the radial direction. In the tire 2, the point of intersection TE is a tread reference end. The tread reference end TE located on the left side in the surface of the drawing sheet of FIG. 2 is a first tread reference end TE1, and the tread reference end TE located on the right side therein is a second tread reference end TE2.

In FIG. 2, a length indicated by reference sign TW is the width of the tread 4. The width TW of the tread 4 is the distance in the axial direction from the first tread reference end TE1 to the second tread reference end TE2. Each tread reference end TE is a reference position for specifying the width TW of the tread 4. In the tire 2, the ratio of the width TW of the tread 4 to the cross-sectional width is not less than 70% and not greater than 90%.

Figure 3:
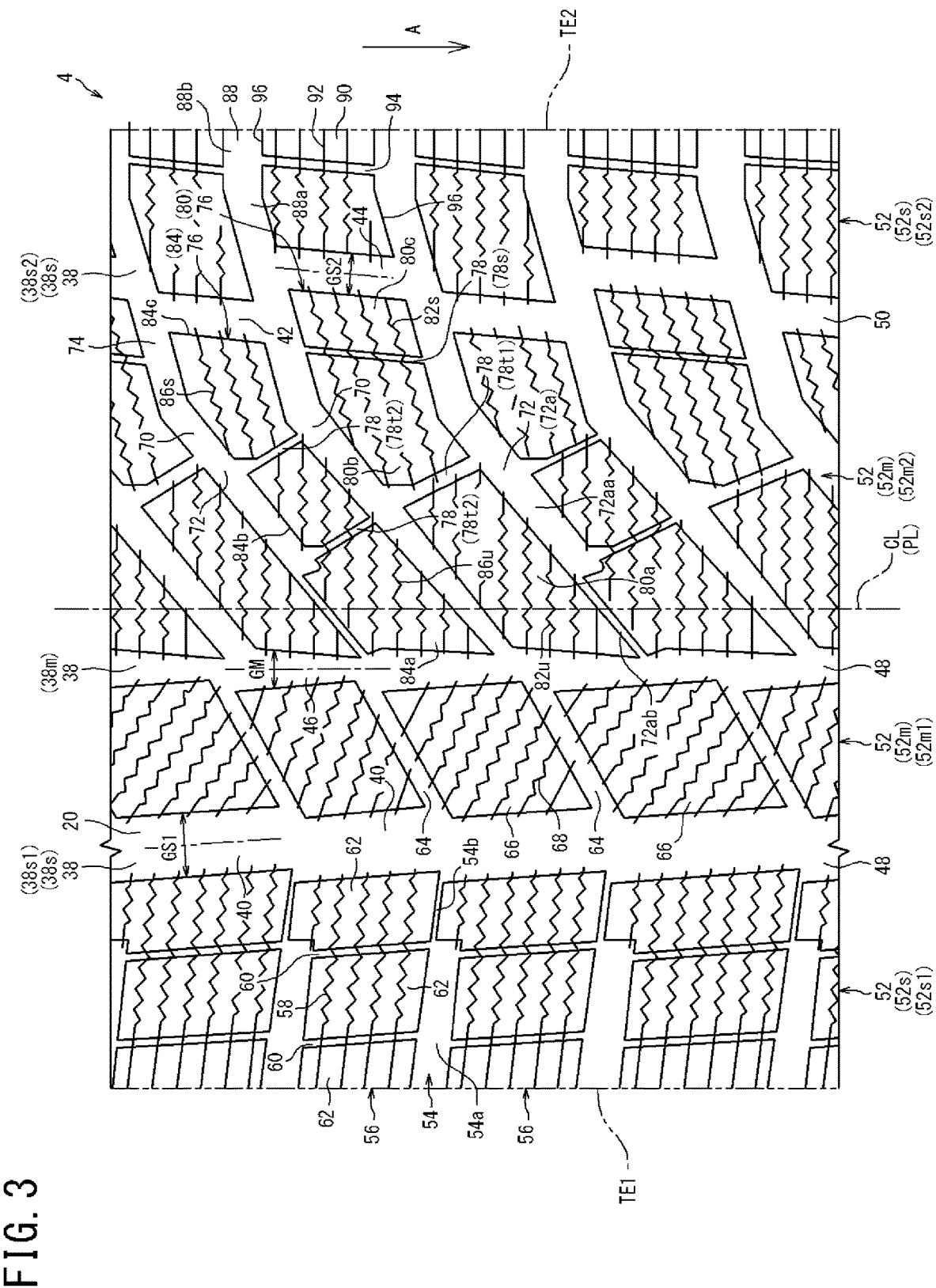
FIG. 3 is a development showing an outer surface of a tread.

FIG. 3 shows a part of the outer surface of the tread 4. In FIG. 3, the right-left direction is the axial direction of the tire 2, and the up-down direction is the circumferential direction of the tire 2. The direction perpendicular to the surface of the drawing sheet of FIG. 3 is the radial direction of the tire 2. In FIG. 3, a direction indicated by an arrow A is the rotation direction of the tire 2. In the surface of the drawing sheet of FIG. 3, the lower side is a rotation direction toe side, and the upper side is a rotation direction heel side. The rotation direction toe side is also called the toe side. The rotation direction heel side is also called the heel side.

As shown in FIG. 3, the tread pattern of the tire 2 is asymmetric with respect to the equator plane CL. The tread pattern is an asymmetric pattern. In the tire 2, the direction of the tread 4 when the tire is mounted on a vehicle is designated. The tire 2 is mounted on the vehicle such that the first tread reference end TE1 is located on the outer side in the width direction of the vehicle and the second tread reference end TE2 is located on the inner side in the width direction of the vehicle.

In the tire 2, the grooves 20 forming the tread pattern include a circumferential groove 38 extending in the circumferential direction. In the tire 2, a plurality of circumferential grooves 38 are formed on the tread 4 so as to be aligned in the axial direction. As shown in FIG. 3, three circumferential grooves 38 are formed on the tread 4 of the tire 2.

Among the three circumferential grooves 38, the circumferential groove 38 located on each outer side in the axial direction is a shoulder circumferential groove 38s. Of the two shoulder circumferential grooves 38s, the shoulder circumferential groove 38s located on the first tread reference end TE1 side is a first shoulder circumferential groove 38s1, and the shoulder circumferential groove 38s located on the second tread reference end TE2 side is a second shoulder circumferential groove 38s2.

The first shoulder circumferential groove 38s1 includes a plurality of straight groove elements 40. An angle of each straight groove element 40 with respect to the circumferential direction is not greater than 10 degrees. As shown in FIG. 3, each straight groove element 40 is slightly inclined relative to the circumferential direction. The straight groove element 40 is formed on the tread 4 such that the interval between the straight groove element 40 and the equator plane CL decreases from the heel side toward the toe side.

In the tire 2, the first shoulder circumferential groove 38s1 is formed by connecting the plurality of straight groove elements 40. The first shoulder circumferential groove 38s1 continuously extends in the circumferential direction.

The second shoulder circumferential groove 38s2 includes a plurality of inner groove elements 42 and a plurality of outer groove elements 44. An angle of each inner groove element 42 with respect to the circumferential direction is not greater than 10 degrees. As shown in FIG. 3, each inner groove element 42 is slightly inclined relative to the circumferential direction. The inner groove element 42 is formed on the tread 4 such that the interval between the inner groove element 42 and the equator plane CL decreases from the heel side toward the toe side.

Each outer groove element 44 is located outward of the inner groove element 42 in the axial direction. An angle of the outer groove element 44 with respect to the circumferential direction is not greater than 10 degrees. As shown in FIG. 3, each outer groove element 44 is slightly inclined relative to the circumferential direction. The outer groove element 44 is formed on the tread 4 such that the interval between the outer groove element 44 and the equator plane CL decreases from the heel side toward the toe side. In the tire 2, the direction in which each outer groove element 44 is inclined is the same as the direction in which each inner groove element 42 is inclined.

In the tire 2, the inner groove elements 42 and the outer groove elements 44 are alternately arranged in the circumferential direction. The second shoulder circumferential groove 38s2 is formed by alternately connecting the inner groove elements 42 and the outer groove elements 44. As described above, each outer groove element 44 is located outward of the inner groove element 42 in the axial direction. The second shoulder circumferential groove 38s2 intermittently extends in the circumferential direction.

Among the three circumferential grooves 38, the circumferential groove 38 located inward of the shoulder circumferential grooves 38s in the axial direction is a middle circumferential groove 38m.

The middle circumferential groove 38m includes a plurality of tapered elements 46. Each tapered element 46 extends in the circumferential direction. The tapered element 46 is an element formed such that the width thereof decreases from the heel side toward the toe side. The ratio of the width of the tapered element 46 on the toe side to the width of the tapered element 46 on the heel side is not less than 0.5 and not greater than 0.7.

In the tire 2, the middle circumferential groove 38m is formed by connecting the plurality of tapered elements 46. The middle circumferential groove 38m continuously extends in the circumferential direction.

In the tire 2, in consideration of ensuring drainage performance and a ground-contact area, a groove width GS1 of the first shoulder circumferential groove 38s1 is set in the range of not less than 4% and not greater than 8% of the width TW of the tread 4. A groove width GM of the middle circumferential groove 38m is smaller than the groove width GS1 of the first shoulder circumferential groove 38s1. The ratio (GM/GS1) of the groove width GM to the groove width GS1 is set in the range of not less than 30% and not greater than 50%. A groove width GS2 of the second shoulder circumferential groove 38s2 is smaller than the groove width GS1 of the first shoulder circumferential groove 38s1 and larger than the groove width GM of the middle circumferential groove 38m. The ratio (GS2/GS1) of the groove width GS2 to the groove width GS1 is set in the range of not less than 55% and not greater than 75%.

As shown in FIG. 3, the middle circumferential groove 38m of the tire 2 is located between the equator plane CL and the first shoulder circumferential groove 38s1 in the axial direction. The middle circumferential groove 38m is not located on the equator plane CL. The middle circumferential groove 38m is provided so as to be shifted from the equator plane CL to the first tread reference end TE1 side.

In the tire 2, the first shoulder circumferential groove 38s1 and the middle circumferential groove 38m are located in a zone (hereinafter, a first zone) from the equator PC to the first tread reference end TE1. Each of the first shoulder circumferential groove 38s1 and the middle circumferential groove 38m, which are located in the first zone, is also referred to as a first circumferential groove 48. The second shoulder circumferential groove 38s2 is located in a zone (hereinafter, a second zone) from the equator PC to the second tread reference end TE2. The second shoulder circumferential groove 38s2, which is located in the second zone, is also referred to as a second circumferential groove 50.

In the tire 2, a total groove volume V1 of the first circumferential groove 48 is represented as the total of the groove volume of the first shoulder circumferential groove 38s1 and the groove volume of the middle circumferential groove 38m. A total groove volume V2 of the second circumferential groove 50 is represented as the groove volume of the second shoulder circumferential groove 38s2.

In the present disclosure, the groove volume of each circumferential groove 38 is calculated using 3D data on the tire outer surface shape, measured, for example, by a displacement sensor. In the case where there is a lateral groove traversing the circumferential groove 38, the lateral groove is closed by virtually extending the groove wall of the circumferential groove 38 located on the toe side of the lateral groove or the groove wall of the circumferential groove 38 located on the heel side of the lateral groove, thereby specifying one circumferential groove 38.

In the tire 2, a plurality of land portions 52 are formed by forming the plurality of circumferential grooves 38 on the tread 4. As shown in FIG. 3, in the tire 2, four land portions 52 are formed so as to be aligned in the axial direction, by forming the three circumferential grooves 38. Among the four land portions 52, the land portion 52 located on each outer side in the axial direction is a shoulder land portion 52s, and the land portion 52 located inward of the shoulder land portion 52s is a middle land portion 52m. Of the two shoulder land portions 52s, the shoulder land portion 52s located on the first tread reference end TE1 side is a first shoulder land portion 52s1, and the shoulder land portion 52s located on the second tread reference end TE2 side is a second shoulder land portion 52s2. Of the two middle land portions 52m, the middle land portion 52m located on the first tread reference end TE1 side is a first middle land portion 52m1, and the middle land portion 52m located on the second tread reference end TE2 side is a second middle land portion 52m2.

Lateral grooves 54 are formed on the first shoulder land portion 52s1. The lateral grooves 54 extend between the first tread reference end TE1 and the first shoulder circumferential groove 38s1. An angle of each lateral groove 54 with respect to the axial direction is not greater than 10 degrees. As shown in FIG. 3, each lateral groove 54 is slightly inclined relative to the axial direction. The lateral groove 54 is formed on the first shoulder land portion 52s1 such that an inner portion of the lateral groove 54 in the axial direction is located on the toe side with respect to an outer portion thereof.

Each lateral groove 54 includes a wide portion 54a and a narrow portion 54b located inward of the wide portion 54a. The groove width of the wide portion 54a is not less than 3% and not greater than 5% of the width TW of the tread 4. The narrow portion 54b has a groove width that is 0.10 times to 0.20 times the groove width of the wide portion 54a.

In the tire 2, a plurality of blocks 56 are formed in the first shoulder land portion 52s1 by forming the multiple lateral grooves 54 on the first shoulder land portion 52s1. These blocks 56 are aligned in the circumferential direction. A plurality of sipes 58 are formed on each block 56. The direction in which the sipes 58 are inclined is the same as the direction in which the lateral grooves 54 are inclined.

Narrow grooves 60 are further formed on each block 56 of the first shoulder land portion 52s1. The narrow grooves 60 extend between the lateral groove 54 on the toe side and the lateral groove 54 on the heel side. The direction in which the narrow grooves 60 are inclined is the same as the direction in which the straight groove elements 40 included in the first shoulder circumferential groove 38s1 are inclined. In the tire 2, a plurality of pieces 62 are formed in the block 56 so as to be aligned in the axial direction, by forming the multiple narrow grooves 60 on the block 56. Each narrow groove 60 has a groove width that is 0.15 times to 0.25 times the groove width of the wide portion 54a which forms a part of the lateral groove 54.

Inclined grooves 64 are formed on the first middle land portion 52m1. The inclined grooves 64 extend between the first shoulder circumferential groove 38s1 and the middle circumferential groove 38m. An angle of each inclined groove 64 with respect to the axial direction is not less than 20 degrees and not greater than 30 degrees. Each inclined groove 64 is inclined relative to the axial direction. The inclined groove 64 is formed on the first middle land portion 52m1 such that an outer portion of the inclined groove 64 in the axial direction is located on the toe side with respect to an inner portion thereof. The groove width of the inclined groove 64 is not less than 1% and not greater than 3% of the width TW of the tread 4.

In the tire 2, a plurality of blocks 66 are formed in the first middle land portion 52m1 by forming the multiple inclined grooves 64 on the first middle land portion 52m1. These blocks 66 are aligned in the circumferential direction. A plurality of sipes 68 are formed on each block 66. As shown in FIG. 3, the direction in which the sipes 68 are inclined is opposite to the direction in which the inclined grooves 64 are inclined.

Inclined grooves 70 are formed on the second middle land portion 52m2. The inclined grooves 70 extend between the middle circumferential groove 38m and the second shoulder circumferential groove 38s2. Each inclined groove 70 is inclined relative to the axial direction. The inclined groove 70 is formed on the second middle land portion 52m2 such that an inner portion of the inclined groove 70 in the axial direction is located on the toe side with respect to an outer portion thereof. The direction in which the inclined grooves 70 are inclined is the same as the direction in which the inclined grooves 64 formed on the first middle land portion 52m1 are inclined.

In the tire 2, each inclined groove 70 includes a steep inclination portion 72 and a gentle inclination portion 74. In the axial direction, the steep inclination portion 72 is located on the inner side, and the gentle inclination portion 74 is located on the outer side. An angle of the steep inclination portion 72 with respect to the axial direction is not less than 40 degrees and not greater than 50 degrees. An angle of the gentle inclination portion 74 with respect to the axial direction is not less than 10 degrees and not greater than 20 degrees. The inclination angle of the steep inclination portion 72 is larger than the inclination angle of the gentle inclination portion 74. The difference between the inclination angle of the steep inclination portion 72 and the inclination angle of the gentle inclination portion 74 is not less than 20 degrees and not greater than 40 degrees.

The groove width of the gentle inclination portion 74 is not less than 2% and not greater than 4% of the width TW of the tread 4. The steep inclination portion 72 is formed such that the groove width thereof decreases from the boundary between the gentle inclination portion 74 and the steep inclination portion 72 toward the middle circumferential groove 38m. Among the steep inclination portions 72 of the inclined grooves 70 aligned in the circumferential direction, each steep inclination portion 72a with respect to which a narrow block described later is located on the toe side and a wide block described later is located on the heel side includes a wide portion 72aa and a narrow portion 72ab. The narrow portion 72ab has a groove width that is 0.10 times to 0.30 times the groove width of the wide portion 72aa.

In the tire 2, a plurality of blocks 76 are formed in the second middle land portion 52m2 by forming the multiple inclined grooves 70 on the second middle land portion 52m2. These blocks 76 are aligned in the circumferential direction.

As shown in FIG. 3, narrow grooves 78 are formed on each block 76. The narrow grooves 78 extend between the inclined groove 70 on the toe side and the inclined groove 70 on the heel side. Each narrow groove 78 has a groove width that is 0.20 times to 0.50 times of the groove width of the gentle inclination portion 74 which forms a part of the inclined groove 70.

In the tire 2, an inclined narrow groove 78t1 and a straight narrow groove c are formed as the narrow grooves 78 on the block 76 (hereinafter, wide block 80) located between the middle circumferential groove 38m and each outer groove element 44 of the second shoulder circumferential groove 38s2. Accordingly, an inner piece 80a, an intermediate piece 80b, and an outer piece 80c are formed in the wide block 80. The direction in which the straight narrow groove 78s is inclined is the same as the direction in which the outer groove element 44 is inclined. The inclined narrow groove 78t1 is formed on the wide block 80 such that the toe side thereof is located axially outward of the heel side thereof. An angle of the inclined narrow groove 78t1 with respect to the circumferential direction is not less than 30 degrees and not greater than 40 degrees.

As shown in FIG. 3, a plurality of inner sipes 82u are formed on the inner piece 80a of the wide block 80 so as to extend in the axial direction. A plurality of outer sipes 82s are formed on each of the intermediate piece 80b and the outer piece 80c so as to be slightly inclined relative to the axial direction.

In the tire 2, two inclined narrow grooves 78*t*2 are formed as the narrow grooves 78 on the block 76 (hereinafter, narrow block 84) located between the middle circumferential groove 38*m* and each inner groove element 42 of the second shoulder circumferential groove 38*s*2. Accordingly, an inner piece 84*a*, an intermediate piece 84*b*, and an outer piece 84*c* are formed in the narrow block 84. The direction in which the inclined narrow grooves 78*t*2 are inclined is the same as the direction in which the inclined narrow groove 78*t*1 formed on the wide block 80 is inclined.

As shown in FIG. 3, a plurality of inner sipes 86*u* are formed on each of the inner piece 84*a* and the intermediate piece 84*b* of the narrow block 84 so as to extend in the axial direction. A plurality of outer sipes 86*s* are formed on the outer piece 84*c* so as to be slightly inclined relative to the axial direction.

Lateral grooves 88 are formed on the second shoulder land portion 52*s*2. The lateral grooves 88 extend between the second shoulder circumferential groove 38*s*2 and the second tread reference end TE2. Each lateral groove 88 includes an inclined portion 88*a* and a straight portion 88*b*. The inclined portion 88*a* is inclined relative to the axial direction. The inclined portion 88*a* is continuous with the gentle inclination portion 74 of the inclined groove 70 formed on the second middle land portion 52*m*2. The direction in which the inclined portion 88*a* is inclined is the same as the direction in which the gentle inclination portion 74 is inclined. The straight portion 88*b* extends in the axial direction. The groove width of the inclined portion 88*a* is equal to the groove width of the gentle inclination portion 74 which forms a part of the inclined groove 70 of the second middle land portion 52*m*2. The straight portion 88*b* has a groove width that is 1.1 times to 1.3 times the groove width of the inclined portion 88*a*.

In the tire 2, a plurality of blocks 90 are formed in the second shoulder land portion 52*s*2 by forming the multiple lateral grooves 88 on the second shoulder land portion 52*s*2. These blocks 90 are aligned in the circumferential direction. A plurality of sipes 92 are formed on each block 90. The sipes 92 extend in the axial direction.

As shown in FIG. 3, a narrow groove 94 is further formed on each block 90 of the second shoulder land portion 52*s*2. The narrow groove 94 extends between the lateral groove 88 on the toe side and the lateral groove 88 on the heel side. The direction in which the narrow groove 94 is inclined is the same as the direction in which the inner groove element 42 or the outer groove element 44 included in the second shoulder circumferential groove 38*s*2 is inclined. The narrow groove 94 has a groove width that is 0.15 times to 0.25 times the groove width of the inclined portion 88*a* which forms a part of the lateral groove 88. In the tire 2, a plurality of pieces 96 are formed in the block 90 so as to be aligned in the axial direction, by forming a plurality of narrow grooves 94 on the block 90.

In FIG. 1, a double-headed arrow WS1 indicates the width of the first shoulder land portion 52*s*1. The width WS1 is the distance in the axial direction from the edge of the first shoulder circumferential groove 38*s*1 to the first tread reference end TE1. A double-headed arrow WM1 indicates the width of the first middle land portion 52*m*1. The width WM1 is the distance in the axial direction from the edge of the first shoulder circumferential groove 38*s*1 to the edge of the middle circumferential groove 38*m*. A double-headed arrow WM2 is the width of the second middle land portion 52*m*2. The width WM2 is the distance in the axial direction from the edge of the middle circumferential groove 38*m* to the edge of the second shoulder circumferential groove 38*s*2. A double-headed arrow WS2 is the width of the second shoulder land portion 52*s*2. The width WS2 is the distance in the axial direction from the edge of the second shoulder circumferential groove 38*s*2 to the second tread reference end TE2. In the case where the width of the land portion 52 changes in the circumferential direction, the average of the maximum width and the minimum width of the land portion 52 is used as the width of the land portion 52.

In the tire 2, from the viewpoint of ensuring a ground-contact area and drainage performance, the ratio (WS1/TW) of the width WS1 of the first shoulder land portion 52*s*1 to the width TW of the tread 4 is set in the range of not less than 20% and not greater than 30%. The ratio (WM1/TW) of the width WM1 of the first middle land portion 52*m*1 to the width TW of the tread 4 is set in the range of not less than 10% and not greater than 20%. The ratio (WM2/TW) of the width WM2 of the second middle land portion 52*m*2 to the width TW of the tread 4 is set in the range of not less than 30% and not greater than 40%. The ratio (WS2/TW) of the width WS2 of the second shoulder land portion 52*s*2 to the width TW of the tread 4 is set in the range of not less than 10% and not greater than 20%.

As described above, in the meridian cross-section of the tire 2 in the standard state, the contour of the tread surface T is represented by a plurality of arcs aligned in the axial direction. In the tire 2, the plurality of arcs representing the contour of the tread surface T include a pair of crown arcs which each have a center on the equator plane CL of the tire 2 and are tangent to each other at the equator PC. Of the pair of crown arcs, the crown arc on the first tread reference end TE1 side is also referred to as a first crown arc. The crown arc on the second tread reference end TE2 side is also referred to as a second crown arc.

In FIG. 2, an arrow indicated by reference sign CR1 indicates the radius of the first crown arc. An arrow indicated by reference sign CR2 indicates the radius of the second crown arc. A position indicated by reference sign P1 is a position on the tread surface T. A length indicated by reference sign W10 is the distance in the axial direction from the equator PC to the position P1. In the tire 2, the ratio (W10/RW) of the distance W10 in the axial direction to the rim width RW is 10%. The position P1 is the position, on the tread surface T, at which the distance W10 from the equator PC corresponds to 10% of the rim width RW. The position P1 is a crown reference position for specifying the radius of the crown arc. The crown reference position P1 on the first tread reference end TE1 side is also referred to as a first crown reference position P1*a*, and the crown reference position P1 on the second tread reference end TE2 side is also referred to as a second crown reference position P1*b*.

In the tire 2, a radius CR1 of the first crown arc is represented as the radius of an arc that has a center on the equator plane CL and that passes through the equator PC and the first crown reference position P1*a*. A radius CR2 of the second crown arc is represented as the radius of an arc that has a center on the equator plane CL and that passes through the equator PC and the second crown reference position P1*b*.

When the radius CR of each crown arc is specified, the radii of the other arcs forming the contour of the tread surface T are specified. The method for specifying the radius of the arc will described below with the case where two arcs are present between the crown arc and the shoulder arc, as an example. Of the two arcs located between the crown arc and the shoulder arc, the arc located on the crown arc side is referred to as a middle arc, and the arc on the shoulder arc side is referred to as a side arc. Although not described in detail, the middle arc and the side arc are located between the crown arc and the shoulder arc in the tire 2.

(1) The position at which the arc having a radius CR deviates from the tread surface T is specified as the outer end of a portion (hereinafter, also referred to as a crown contour line) represented by the crown arc.

(2) The position, on the tread surface T, at which the distance from the outer end of the crown contour line corresponds to 10% of the rim width RW is specified as a middle reference position.

(3) The radius of an arc that has a center on a straight line passing through the outer end of the crown contour line and the center of the crown arc and that passes through the outer end of the crown contour line and the middle reference position is specified as the radius of the middle arc.

(4) The outer end of a portion (hereinafter, also referred to as a middle contour line) represented by the middle arc is specified in the same manner as for the outer end of the crown contour line.

(5) The position, on the tread surface T, at which the distance from the outer end of the middle contour line corresponds to 10% of the rim width RW is specified as a side reference position.

(6) The radius of an arc that has a center on a straight line passing through the outer end of the middle contour line and the center of the middle arc and that passes through the outer end of the middle contour line and the side reference position is specified as the radius of the side arc.

(7) The outer end of a portion (hereinafter, also referred to as a side contour line) represented by the side arc is specified in the same manner as for the outer end of the crown contour line.

(8) The position, on the tread surface T, at which the distance from the equator PC corresponds to 50% of the rim width RW is specified as a shoulder reference position.

(9) The radius of an arc that has a center on a straight line passing through the outer end of the side contour line and the center of the side arc and that passes through the outer end of the side contour line and the shoulder reference position is specified as a radius SR of the shoulder arc.

In the tire 2, the ratio (CR1/CR2) of the radius CR1 of the first crown arc to the radius CR2 of the second crown arc is not less than 1.10 and not greater than 1.70.

Since the ratio (CR1/CR2) is not less than 1.10, when the tire 2 is mounted on a vehicle, the tire 2 can effectively increase the ground-contact area of the first zone located on the outer side in the width direction of the vehicle. In the tire 2, handling performance on a dry road surface and a wet road surface and uneven wear resistance are effectively improved. From this viewpoint, the ratio (CR1/CR2) is preferably not less than 1.20 and more preferably not less than 1.30.

Since the ratio (CR1/CR2) is not greater than 1.70, an excessive load is inhibited from being applied to the first zone located on the outer side in the width direction of the vehicle. The tire 2 can appropriately maintain good handling performance on a dry road surface and a wet road surface and good uneven wear resistance. From this viewpoint, the ratio (CR1/CR2) is preferably not greater than 1.65 and more preferably not greater than 1.60.

In the tire 2, the total groove volume V1 of the first circumferential groove 48 is larger than the total groove volume V2 of the second circumferential groove 50. In the tire 2, drainage performance of the first zone located on the outer side during cornering at a high speed is improved. The tire 2 has excellent handling performance on a wet road surface.

In the tire 2, the ratio (CR1/CR2) of the radius CR1 of the crown arc located on the first tread reference end TE1 side, to the radius CR2 of the crown arc located on the second tread reference end TE2 side, is not less than 1.10 and not greater than 1.70, and the total groove volume V1 of the first circumferential groove 48 is larger than the total groove volume V2 of the second circumferential groove 50. The tire 2 can achieve improvement of handling performance on a dry road surface and a wet road surface without a decrease in uneven wear resistance.

As shown in FIG. 1, the tread surface T is curved such that a portion thereof at the equator PC projects in the outer direction. The distance in the radial direction from the equator PC to an arbitrary position on the tread surface T gradually increases from the equator PC to the tread reference end TE. This distance in the radial direction represents the degree of drop of the tread surface T from the equator PC. The degree of drop influences a ground-contact shape and a ground-contact pressure distribution.

In FIG. 1, reference sign PD indicates a specific position on the tread surface T. A length indicated by reference sign W45 is the distance in the axial direction from the equator plane CL to the specific position PD. In the tire 2, the ratio (W45/RW) of the distance W45 in the axial direction to the rim width RW is 45%. The position PD is the position, on the tread surface T, at which the distance W45 in the axial direction from the equator plane CL is 45% of the rim width RW. In the present disclosure, this position PD is a drop reference position. The distance in the radial direction from the equator PC to the drop reference position PD is a drop amount as an index that represents the degree of drop of the tread surface T. In FIG. 1, a length indicated by reference sign d1 is a drop amount on the first tread reference end TE1 side, and a length indicated by reference sign d2 is a drop amount on the second tread reference end TE2 side.

The ground-contact surface of the tire 2 is controlled such that the ground-contact width of a ground-contact surface obtained when a load that is 70% of the normal load is applied as a vertical load to the tire 2 in the standard state and the tire 2 is brought into contact with a road surface formed as a flat surface in a state where the camber angle of the tire 2 is set to 0°, is in the range of not less than 70% and not greater than 90% of the width TW of the tread 4. In the tire 2, the width TW of the tread 4 is substantially equal to the rim width RW. When the tire 2 comes into contact with a road surface, each ground-contact end is located near the drop reference position PD. The drop amount at the drop reference position PD is an effective index for obtaining an appropriate ground-contact shape and an appropriate ground-contact pressure distribution.

In the tire 2, preferably, the drop amount d2 on the second tread reference end TE2 side is larger than the drop amount d1 on the first tread reference end TE1 side, and the difference (d2−d1) between the drop amount d2 on the second tread reference end TE2 side and the drop amount d1 on the first tread reference end TE1 side is not less than 1.0 mm and not greater than 6.0 mm.

In the tire 2, when the tire 2 is mounted on a vehicle, the ground-contact area of the first zone located on the outer side in the width direction of the vehicle is increased. Since an effective ground-contact area during cornering at a high speed is increased, a local increase in ground-contact pressure is suppressed. Since the tread 4 sufficiently comes into contact with a road surface, handling performance on a dry road surface is improved.

Since the ground-contact area of the first zone is increased, the groove area of the first circumferential groove 48 included in the first zone can be increased. Since the increase in groove area contributes to an increase in groove volume, drainage performance is improved. In the tire 2, handling performance on a wet road surface is also improved.

As for a ground-contact length at a position corresponding to 80% of a ground-contact width, the ground-contact length on the outer side in the width direction of the vehicle and the ground-contact length on the inner side in the width direction of the vehicle are set so as to be substantially equal to each other. The ground-contact pressure distribution during straight running is less likely to become uneven, so that the tire 2 has improved uneven wear resistance.

In the tire 2, from the viewpoint that the tire 2 can achieve improvement of handling performance on a dry road surface and a wet road surface and improvement of uneven wear resistance, the difference (d2−d1) is more preferably not less than 2.0 mm and further preferably not less than 2.5 mm. From the viewpoint that the tire 2 can appropriately maintain good handling performance on a dry road surface and a wet road surface and good uneven wear resistance, the difference (d2−d1) is more preferably not greater than 5.0 mm and further preferably not greater than 4.5 mm.

In the tire 2, preferably, the ratio (CR1/CR2) of the radius CR1 of the crown arc located on the first tread reference end TE1 side, to the radius CR2 of the crown arc located on the second tread reference end TE2 side, is not less than 1.10 and not greater than 1.70, the drop amount d2 on the second tread reference end TE2 side is larger than the drop amount d1 on the first tread reference end TE1 side, the difference (d2−d1) between the drop amount d2 on the second tread reference end TE2 side and the drop amount d1 on the first tread reference end TE1 side is not less than 1.0 mm and not greater than 6.0 mm, and the total groove volume V1 of the first circumferential groove 48 is larger than the total groove volume V2 of the second circumferential groove 50. This tire 2 can achieve improvement of handling performance on a dry road surface and a wet road surface without a decrease in uneven wear resistance.

In FIG. 2, an arrow SR1 indicates the radius of a shoulder arc (hereinafter, a first shoulder arc) located on the first tread reference end TE1 side. An arrow SR2 indicates the radius of a shoulder arc (hereinafter, a second shoulder arc) located on the second tread reference end TE2 side.

In the tire 2, the ratio (SR1/SR2) of the radius SR1 of the first shoulder arc to the radius SR2 of the second shoulder arc is preferably not less than 1.05 and not greater than 1.35.

When the ratio (SR1/SR2) is set so as to be not less than 1.05, a portion, of the first zone, which does not come into contact with a road surface during straight running can come into contact with a road surface during cornering at a high speed. Since the ground-contact surface is extended outward, the effective ground-contact area is increased. The tire 2 can improve handling performance on a dry road surface and a wet road surface. From this viewpoint, the ratio (SR1/SR2) is more preferably not less than 1.10 and further preferably not less than 1.15.

When the ratio (SR1/SR2) is set so as to be not greater than 1.35, an excessive load is inhibited from being applied to the first zone located on the outer side in the width direction of the vehicle. The tire 2 can appropriately maintain good handling performance on a dry road surface and a wet road surface and good uneven wear resistance. From this viewpoint, the ratio (SR1/SR2) is more preferably not greater than 1.30 and further preferably not greater than 1.25.

As described above, the total groove volume V1 of the first circumferential groove 48 is larger than the total groove volume V2 of the second circumferential groove 50. In the tire 2, the ratio (V1/V2) of the total groove volume V1 of the first circumferential groove 48 to the total groove volume V2 of the second circumferential groove 50 is preferably not less than 1.2 and not greater than 1.9.

When the ratio (V1/V2) is set so as to be not less than 1.2, drainage performance of the first zone located on the outer side during cornering at a high speed is improved. The tire 2 has excellent handling performance on a wet road surface. From this viewpoint, the ratio (V1/V2) is more preferably not less than 1.3 and further preferably not less than 1.4.

When the ratio (V1/V2) is set so as to be not greater than 1.9, the required stiffness is ensured in the tread 4 in the first zone. With the tire 2, good handling performance is maintained. From this viewpoint, the ratio (V1/V2) is more preferably not greater than 1.8 and further preferably not greater than 1.7.

In FIG. 1, a length indicated by reference sign DS1 is the groove depth of the first shoulder circumferential groove 38$s$1. A length indicated by reference sign DM is the groove depth of the middle circumferential groove 38$m$. A length indicated by reference sign DS2 is the groove depth of the second shoulder circumferential groove 38$s$2. A length indicated by reference sign A is the thickness of the tread 4. The thickness A is measured along the equator plane CL.

In the tire 2, the groove depth DS1 of the first shoulder circumferential groove 38$s$1 and the groove depth DM of the middle circumferential groove 38$m$ are equal to each other. The groove depth DS1 of the first shoulder circumferential groove 38$s$1 and the groove depth DM of the middle circumferential groove 38$m$ may be different from each other. As described above, each of the first shoulder circumferential groove 38$s$1 and the middle circumferential groove 38$m$ is the first circumferential groove 48. A groove depth D1 of the first circumferential groove 48 is represented as the average of the groove depth DS1 of the first shoulder circumferential groove 38$s$1 and the groove depth DM of the middle circumferential groove 38$m$. In the tire 2, from the viewpoint of improving drainage performance and ensuring the stiffness of the tread 4, the ratio (D1/A) of the groove depth D1 of the first circumferential groove 48 to the thickness A of the tread is preferably not less than 0.70 and not greater than 0.95.

As described above, in the tire 2, the second shoulder circumferential groove 38$s$2 is the second circumferential groove 50. The groove depth DS2 of the second shoulder circumferential groove 38$s$2 is a groove depth D2 of the second circumferential groove 50. In the case where a plurality of circumferential grooves 38 are formed in the second zone, the groove depth D2 of the second circumferential groove 50 is represented as the average of the groove depths of these circumferential grooves 38.

In the tire 2, the radius CR1 of the crown arc located on the first tread reference end TE1 side is larger than the radius CR2 of the crown arc located on the second tread reference end TE2 side, and the drop amount d1 on the first tread reference end TE1 side is smaller than the drop amount d2 on the second tread reference end TE2 side. In the tire 2, the volume of the tread 4 in the first zone is larger than the volume of the tread 4 in the second zone. Even when the first circumferential groove 48 deeper than the second circumferential groove 50 is formed, the required stiffness is ensured in the tread 4 in the first zone.

In the tire 2, the second circumferential groove 50 is shallower than the first circumferential groove 48. The shallower second circumferential groove 50 contributes to ensuring the stiffness of the second zone. The deeper first circumferential groove 48 contributes to improvement of drainage performance during cornering at a high speed. The deeper first circumferential groove 48 further can contribute to increasing the groove volume without increasing the groove area. The tire 2 can further improve handling performance on a dry road surface and a wet road surface. From this viewpoint, the second circumferential groove 50 is preferably shallower than the first circumferential groove 48.

In the tire 2, from the viewpoint of improving handling performance on a dry road surface and a wet road surface, the ratio (D1/D2) of the groove depth D1 of the first circumferential groove 48 to the groove depth D2 of the second circumferential groove 50 is preferably not less than 1.3, more preferably not less than 1.4, and further preferably not less than 1.5. From the viewpoint of ensuring the required stiffness in the tread 4 in the first zone, the ratio (D1/D2) is preferably not greater than 2.0, more preferably not greater than 1.9, and further preferably not greater than 1.8.

In FIG. 1, a length indicated by reference sign F1 is the distance in the axial direction from the equator PC to the middle circumferential groove 38*m*. The middle circumferential groove 38*m* is the first circumferential groove 48 closest to the equator PC in the first zone. The distance F1 in the axial direction is the distance from the equator PC to the first circumferential groove 48 proximate to the equator PC. A length indicated by reference sign F2 is the distance in the axial direction from the equator PC to the second shoulder circumferential groove 38*s*2. The second shoulder circumferential groove 38*s*2 is the second circumferential groove 50 closest to the equator PC in the second zone. The distance F2 in the axial direction is the distance from the equator PC to the second circumferential groove 50 proximate to the equator PC. In the case where the distance F1 in the axial direction changes in the circumferential direction, the distance F1 in the axial direction is represented as the average of the maximum value and the minimum value of the distance F1 in the axial direction. The same applies to the distance F2 in the axial direction.

In the tire 2, the distance F2 in the axial direction is longer than the distance F1 in the axial direction. The longer distance F2 in the axial direction contributes to ensuring a ground-contact area in the second zone. The shorter distance F1 in the axial direction contributes to improvement of drainage performance during cornering at a high speed. The tire 2 can further improve handling performance on a dry road surface and a wet road surface. From this viewpoint, the distance F2 in the axial direction is preferably longer than the distance F1 in the axial direction.

From the viewpoint of improving drainage performance during cornering at a high speed, the ratio (F1/TW) of the distance F1 in the axial direction to the width TW of the tread 4 is preferably not less than 2% and more preferably not less than 3%. From the viewpoint of maintaining good uneven wear resistance, the ratio (F1/TW) is preferably not greater than 7% and more preferably not greater than 6%.

From the viewpoint of improving handling performance, the ratio (F2/TW) of the distance F2 in the axial direction to the width TW of the tread 4 is preferably not less than 25% and more preferably not less than 28%. From the viewpoint of maintaining good uneven wear resistance, the ratio (F2/TW) is preferably not greater than 35% and more preferably not greater than 32%.

As shown in FIG. 3, the second middle land portion 52*m*2 of the tire 2 extends across the equator plane CL, and most of the second middle land portion 52*m*2 is located in the second zone. When the tire 2 is mounted on a vehicle at a negative camber angle, the tire 2 mainly comes into contact with the road surface at the second middle land portion 52*m*2. The second middle land portion 52*m*2 is located between the middle circumferential groove 38*m* as the first circumferential groove 48 and the second shoulder circumferential groove 38*s*2 as the second circumferential groove 50.

As described above, the inclined grooves 70 are formed on the second middle land portion 52*m*2 of the tire 2, and the inclined grooves 70 extend between the middle circumferential groove 38*m* and the second shoulder circumferential groove 38*s*2. The edges of the inclined grooves 70 contribute to generation of traction. Thus, in the tire 2, good handling performance is achieved. The middle circumferential groove 38*m* is the first circumferential groove 48 closest to the equator PC in the first zone. The second shoulder circumferential groove 38*s*2 is the second circumferential groove 50 closest to the equator PC in the second zone. In the tire 2, from the viewpoint of achieving good handling performance, preferably, the inclined grooves 70 are formed on the tread 4 so as to be inclined relative to the circumferential direction, and these inclined grooves 70 extend between the second circumferential groove 50 and the first circumferential groove 48.

In the tire 2, the second shoulder circumferential groove 38*s*2 is located between the second middle land portion 52*m*2 and the second shoulder land portion 52*s*2 in the second zone. In other words, the second shoulder circumferential groove 38*s*2 is the second circumferential groove 50 which is proximate to the equator PC but located in the second zone so as to be farther from the equator PC than the first circumferential groove 48 proximate to the equator PC in the first zone.

As described above, the second shoulder circumferential groove 38*s*2 includes the inner groove elements 42 and the outer groove elements 44, and the inner groove elements 42 and the outer groove elements 44 are alternately arranged in the circumferential direction. The two edges of each inner groove element 42 and the two edges of each outer groove element 44 contribute to generation of traction. Thus, in the tire 2, good handling performance is achieved. Since each outer groove element 44 is located outward of the inner groove element 42 in the axial direction, stress to be applied to the edges of the inner groove element 42 and the outer groove element 44 is effectively distributed. Damage such as chipping is less likely to occur at the edges of the inner groove element 42 or the outer groove element 44, so that the second shoulder circumferential groove 38*s*2 can stably exert its function. From this viewpoint, in the tire 2, preferably, the second circumferential groove 50 which is proximate to the equator PC but located in the second zone so as to be farther from the equator PC than the first circumferential groove 48 proximate to the equator PC in the first zone includes the inner groove elements 42 and the outer groove elements 44 located outward of the inner groove elements 42 in the axial direction, and the inner groove elements 42 and the outer groove elements 44 are alternately arranged in the circumferential direction.

As described above, according to the present invention, the tire 2 that can achieve improvement of handling performance on a dry road surface and a wet road surface without a decrease in uneven wear resistance is obtained. The present invention exhibits a remarkable effect in the tire 2 having a load index of 100 or more and having a speed symbol of H or more.

The tire 2 of the present invention is preferably mounted on a vehicle at a negative camber angle, specifically, at a camber angle greater than −2 degrees and less than 0 degrees. The tire 2 of the present invention is more preferably mounted on a vehicle having a maximum output of 100 kW or higher, at a camber angle greater than −2 degrees and less than 0 degrees.

The vehicle on which the tire 2 of the present invention is mounted is a tire-vehicle combination according to an aspect of the present invention, this combination includes the above-described tire 2 and a vehicle, the tire 2 is mounted on the vehicle at a camber angle greater than −2 degrees and less than 0 degrees, and the vehicle is a passenger car having a maximum output of 100 kW or higher.

EXAMPLES

The following will describe the present invention in further detail by means of examples, etc., but the present invention is not limited to the examples.

Example 1

A pneumatic tire for a passenger car (tire size=245/45R18 100V) having the basic structure shown in FIG. 1 to FIG. 3 and having specifications shown in Table 1 below was obtained.

In Example 1, the ratio (CR1/CR2) of the radius CR1 of the first crown arc to the radius CR2 of the second crown arc was 1.50. The ratio (SR1/SR2) of the radius SR1 of the first shoulder arc to the radius SR2 of the second shoulder arc was 1.20. The difference (d2−d1) between the drop amount d2 on the second tread reference end TE2 side and the drop amount d1 on the first tread reference end TE1 side was 3.5 mm. The ratio (V1/V2) of the total groove volume V1 of the first circumferential groove to the total groove volume V2 of the second circumferential groove was 1.7.

In Example 1, the ratio (F1/TW) of the distance F1 in the axial direction from the equator PC to the middle circumferential groove to the width TW of the tread was 4%. The ratio (F2/TW) of the distance F2 in the axial direction from the equator PC to the second shoulder circumferential groove to the width TW of the tread was 30%. The ratio (D2/D1) of the groove depth D1 of the first circumferential groove to the groove depth D2 of the second circumferential groove was 1.6. The ratio (D1/A) of the groove depth D1 of the first circumferential groove to the thickness A of the tread was 0.93.

Comparative Example 1

A tire of Comparative Example 1 is a conventional tire. The tread pattern of Comparative Example 1 was a symmetric pattern, and the contour of the tread surface T was a symmetric profile.

Comparative Examples 2 and 3

Tires of Comparative Examples 2 and 3 were obtained in the same manner as Example 1, except that the radius CR1, the radius SR1, and the drop amount d1 were changed such that the ratio (CR1/CR2), the ratio (SR1/SR2), and the difference (d2−d1) were set as shown in Table 1 below.

Example 3 and Comparative Example 4

Tires of Example 3 and Comparative Example 4 were obtained in the same manner as Example 1, except that the groove width of the first shoulder circumferential groove was changed such that the ratio (V1/V2) was set as shown in Table 2 below.

Example 2

A tire of Example 2 was obtained in the same manner as Example 1, except that the radius SR1 and the groove width of the first shoulder circumferential groove were changed such that the ratio (SR1/SR2) and the ratio (V1/V2) were set as shown in Table 2 below.

Example 4

A tire of Example 4 was obtained in the same manner as Example 1, except that the radius SR1 was changed such that the ratio (SR1/SR2) was set as shown in Table 2 below.

[Handling Performance (WET)]

Test tires were fitted onto rims (size=18×8.0J) and inflated with air to adjust the internal pressures of the tires to 230 kPa. Each tire was mounted to a test vehicle (passenger car having a maximum output of 135 kW) such that the first tread reference end was located on the outer side in the width direction of the vehicle. The test vehicle was driven on a test course having a wet road surface (water film thickness=1.4 mm), and the driver made evaluations (sensory evaluations) for handling performance. The results are shown as indexes in Tables 1 and 2 below. The higher the value is, the better the handling performance of the tire on a wet road surface is.

[Handling Performance (DRY)]

Test tires were fitted onto rims (size=18×8.0J) and inflated with air to adjust the internal pressures of the tires to 230 kPa. Each tire was mounted to a test vehicle (passenger car having a maximum output of 135 kW) such that the first tread reference end was located on the outer side in the width direction of the vehicle. The test vehicle was driven on a test course having a dry road surface, and the driver made evaluations (sensory evaluations) for handling performance. The results are shown as indexes in Tables 1 and 2 below. The higher the value is, the better the handling performance of the tire on a dry road surface is.

[Uneven Wear Resistance]

Test tires were fitted onto rims (size=18×8.0J) and inflated with air to adjust the internal pressures of the tires to 230 kPa. Each tire was mounted to a test vehicle (passenger car having a maximum output of 135 kW) such that the first tread reference end was located on the outer side in the width direction of the vehicle. The test vehicle was driven on a test course having a dry road surface. After running for 30000 km, the wear state of each rear tire was checked. The amount of wear at a position corresponding to 80% of the ground-contact width was measured. The difference between the amount of wear in the second zone located on the inner side in the width direction of the vehicle and the amount of wear in the first zone located on the outer side in the width direction of the vehicle was measured. The results are shown in Table 1 below. It is preferable if the difference is closer to 0. This evaluation was made on the tires of Comparative Example 1 and Example 1.

TABLE 1

|  | Comparative Example 1 | Comparative Example 2 | Example 1 | Comparative Example 3 |
|---|---|---|---|---|
| CR1/CR2 [—] | 1.00 | 1.00 | 1.50 | 1.90 |
| SR1/SR2 [—] | 1.00 | 1.20 | 1.20 | 1.20 |
| d2 − d1 [mm] | 0.0 | 0.0 | 3.5 | 5.0 |
| V1/V2 [—] | 1.0 | 1.7 | 1.7 | 1.7 |
| WET | 100 | 103 | 107 | 102 |
| DRY | 100 | 102 | 104 | 101 |
| Uneven wear resistance [mm] | 2 | — | 0 | — |

TABLE 2

|  | Comparative Example 4 | Example 2 | Example 3 | Example 4 |
|---|---|---|---|---|
| CR1/CR2 [—] | 1.50 | 1.50 | 1.50 | 1.50 |
| SR1/SR2 [—] | 1.20 | 1.00 | 1.20 | 1.00 |
| d2 − d1 [mm] | 3.5 | 3.5 | 3.5 | 3.5 |
| V1/V2 [—] | 0.8 | 1.1 | 1.1 | 1.7 |
| WET | 98 | 104 | 105 | 105 |
| DRY | 106 | 103 | 105 | 102 |
| Uneven wear resistance [mm] | — | — | — | — |

As shown in Tables 1 and 2, it is confirmed that in each Example, it is possible to achieve improvement of handling performance on a dry road surface and a wet road surface without a decrease in uneven wear resistance. From the evaluation results, advantages of the present invention are clear.

INDUSTRIAL APPLICABILITY

The above-described technology capable of achieving improvement of handling performance on a dry road surface and a wet road surface without a decrease in uneven wear resistance can also be applied to various tires.

REFERENCE SIGNS LIST 2 tire
4 tread
6 sidewall
8 clinch
10 bead
12 carcass
14 belt
16 band
18 inner liner
20 groove
38, 38s, 38s1, 38s2, 38m circumferential groove
48 first circumferential groove
50 second circumferential groove
52, 52s, 52s1, 52s2, 52m1, 52m2 land portion
70 inclined groove of second middle land portion 52m2
72 steep inclination portion of inclined groove 70
74 gentle inclination portion of inclined groove 70

The invention claimed is:
1. A tire comprising a tread having a plurality of circumferential grooves formed thereon so as to be aligned in an axial direction, wherein
a width of the tread is represented as a distance in the axial direction from a first tread reference end to a second tread reference end,
the tire is mounted on a vehicle such that the first tread reference end is located on an outer side in a width direction of the vehicle,
an outer surface of the tire includes a tread surface and a pair of side surfaces connected to ends of the tread surface,
a contour of the tread surface is represented by a plurality of arcs aligned in the axial direction in a meridian cross-section of the tire in a standard state where the tire is fitted on a rim that is a normal rim, an internal pressure of the tire is adjusted to 230 kPa, and no load is applied to the tire,
the plurality of arcs include a pair of crown arcs which each have a center on an equator plane of the tire and are tangent to each other at an equator of the tire, and a pair of shoulder arcs including a first shoulder arc and a second shoulder arc which are each located on an outer side in the axial direction and connected to the side surface,
a ratio of a radius of the crown arc located on the first tread reference end side to a radius of the crown arc located on the second tread reference end side is not less than 1.10 and not greater than 1.70,
the first shoulder arc has a smallest radius among the plurality of arcs from the equator to the first tread reference end,
the second shoulder arc has a smallest radius among the plurality of arcs from the equator to the second tread reference end,
among the plurality of circumferential grooves, a circumferential groove located in a zone from the equator to the first tread reference end is a first circumferential groove, and a circumferential groove located in a zone from the equator to the second tread reference end is a second circumferential groove,
a total groove volume of the first circumferential groove is larger than a total groove volume of the second circumferential groove,
a position, on the tread surface, at which a distance in the axial direction from the equator plane is 45% of a rim width of the rim is a drop reference position,
a distance in a radial direction from the equator to the drop reference position is a drop amount,
in the standard state, a drop amount on the second tread reference end side is larger than a drop amount on the first tread reference end side, and a difference between the drop amount on the second tread reference end side and the drop amount on the first tread reference end side is not less than 1.0 mm and not greater than 6.0 mm,
a ratio of a radius of the shoulder arc located on the first tread reference end side to a radius of the shoulder arc located on the second tread reference end side is not less than 1.05 and not greater than 1.35,
an entirety of each shoulder arc is located axially outward of a corresponding outermost circumferential groove in the axial direction among the plurality of circumferential grooves,
the plurality of circumferential grooves includes a middle circumferential groove as the first circumferential groove located in the zone from the equator to the first tread reference end and proximate to the equator, and a second shoulder circumferential groove as the second circumferential groove located in the zone from the equator to the second tread reference end and proximate to the equator, a distance from the equator to the second shoulder circumferential groove is longer than a distance from the equator to the middle circumferential groove, the middle circumferential groove includes a plurality of tapered elements aligned in a circumferential direction, and each tapered element extends in the circumferential direction, each tapered element having a width that decreases from a heel side toward a toe side.

2. The tire according to claim 1, wherein a ratio of the total groove volume of the first circumferential groove to the total groove volume of the second circumferential groove is not less than 1.2 and not greater than 1.9.

3. The tire according to claim 1, wherein
a ratio of the distance from the equator to the middle circumferential groove, to a width of the tread is not less than 2% and not greater than 7%, and
a ratio of the distance from the equator to the second shoulder circumferential groove, to the width of the tread is not less than 25% and not greater than 35%.

4. The tire according to claim 1, wherein
the second shoulder circumferential groove includes inner groove elements and outer groove elements located outward of the inner groove elements in the axial direction, and
the inner groove elements and the outer groove elements are alternately arranged in a circumferential direction.

5. The tire according to claim 1, wherein
the plurality of circumferential grooves further includes a first shoulder circumferential groove as the first circumferential groove,
the first shoulder circumferential groove is located outward of the middle circumferential groove in the axial direction,
a groove width of the middle circumferential groove is smaller than a groove width of the first shoulder circumferential groove.

6. A tire-vehicle combination comprising the tire according to claim 1 and a vehicle, wherein
the tire is mounted on the vehicle at a camber angle greater than −2 degrees and less than 0 degrees, and
the vehicle is a passenger car having a maximum output of 100 kW or higher.

7. The tire according to claim 1, wherein
the plurality of circumferential grooves further includes a first shoulder circumferential groove as the first circumferential groove located axially outermost in the zone from the equator to the first tread reference end,
the second shoulder circumferential groove is located axially outermost in the zone from the equator to the second tread reference end,
the total groove volume of the first circumferential groove is represented as the total of a groove volume of the first shoulder circumferential groove and a groove volume of the middle circumferential groove, and
the total groove volume of the second circumferential groove is represented as a groove volume of the second shoulder circumferential groove.

8. The tire according to claim 1, wherein the shoulder arc specifies each of the tread reference ends for specifying the width of the tread.

9. The tire according to claim 1, wherein the plurality of arcs includes a pair of middle arcs and a pair of side arcs located between each crown arc and the shoulder arc located axially outward of the crown arc.

10. The tire according to claim 1, wherein
the plurality of arcs includes a pair of middle arcs and a pair of side arcs located between each crown arc and the shoulder arc located axially outward of the crown arc, and
the shoulder arc specifies each of the tread reference ends for specifying the width of the tread.

11. The tire according to claim 1, wherein
the second shoulder circumferential groove includes inner groove elements and outer groove elements located outward of the inner groove elements in the axial direction,
the inner groove elements and the outer groove elements are alternate with each other in a circumferential direction,
the tread includes a plurality of inclined grooves extending between the second shoulder circumferential groove and the middle circumferential groove,
the plurality of inclined grooves forms a plurality of blocks aligned in the circumferential direction between the middle circumferential groove and the second shoulder circumferential groove,
the plurality of blocks includes narrow blocks and wide blocks,
each narrow block is located between the middle circumferential groove and a corresponding inner groove element of the inner groove elements,
each wide block is located between the middle circumferential groove and a corresponding outer groove element of the outer groove elements, and
the narrow blocks and the wide blocks are alternate with each other in the circumferential direction.

12. The tire according to claim 1, wherein
an inclined groove is formed on the tread so as to be inclined relative to a circumferential direction, and
the inclined groove extends between the second shoulder circumferential groove and the middle circumferential groove.

13. The tire according to claim 12, wherein an inner portion of the inclined groove in the axial direction is located on a toe side with respect to an outer portion thereof.

14. The tire according to claim 1, wherein
the second shoulder circumferential groove includes inner groove elements and outer groove elements located outward of the inner groove elements in the axial direction,
the inner groove elements and the outer groove elements are alternate with each other in a circumferential direction,
the tread includes a plurality of inclined grooves extending between the second shoulder circumferential groove and the middle circumferential groove,
the plurality of inclined grooves forms a plurality of blocks aligned in the circumferential direction between the middle circumferential groove and the second shoulder circumferential groove,
the plurality of blocks includes narrow blocks and wide blocks,
each narrow block is located between the middle circumferential groove and a corresponding inner groove element of the inner groove elements,
each wide block is located between the middle circumferential groove and of the inner groove elements outer groove element of the outer groove elements,
the narrow blocks and the wide blocks are alternate with each other in the circumferential direction and
an inner portion of the inclined groove in the axial direction is located on a toe side with respect to an outer portion thereof, and the outer portion of the inclined groove in the axial direction is located on a heel side with respect to the inner portion thereof.

15. The tire according to claim 14, wherein
each wide block includes an inclined narrow groove and a straight narrow groove located axially outward of the inclined narrow groove,
the inclined narrow groove and the straight narrow groove form an inner piece, an intermediate piece, and an outer piece in the wide block,
the direction in which the straight narrow groove is inclined is the same as the direction in which the outer groove element is inclined,
the inclined narrow groove is inclined relative to the circumferential direction, and the toe side of the inclined narrow groove is located axially outward of the heel side thereof, and
each narrow block includes two inclined narrow grooves aligned in the axial direction, the two inclined narrow grooves form an inner piece, an intermediate piece, and an outer piece in the narrow block,
each of the two inclined narrow grooves is inclined relative to the circumferential direction, and
the toe side of each of the two inclined narrow groove is located axially outward of the heel side thereof.

16. The tire according to claim 1, wherein the second circumferential groove is shallower than the first circumferential groove.

17. The tire according to claim 16, wherein a ratio of a groove depth of the first circumferential groove to a groove depth of the second circumferential groove is not less than 1.3 and not greater than 2.0.

18. The tire according to claim 16, wherein a ratio of a groove depth of the first circumferential groove to a thickness of the tread is not less than 0.70 and not greater than 0.95.

* * * * *